CIRCUIT ARRANGEMENTS FOR COLOUR TELEVISION CAMERAS
Filed Jan. 30, 1967
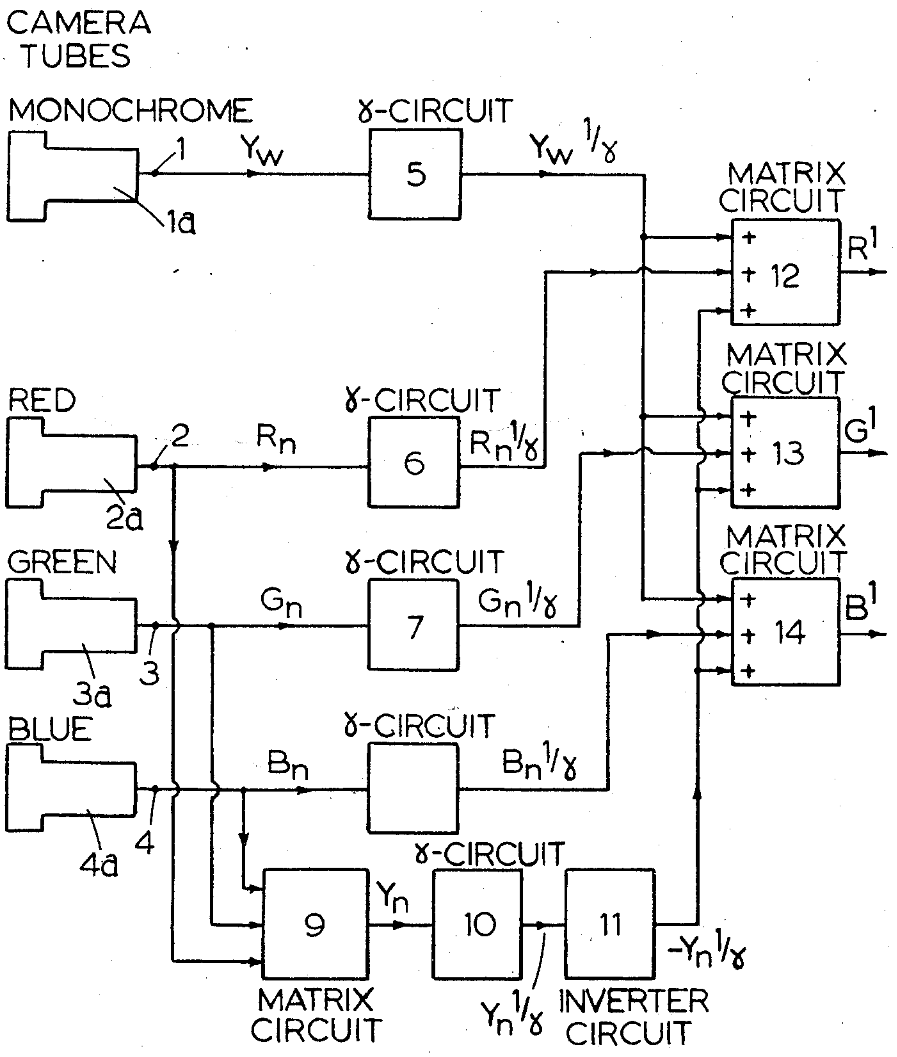

United States Patent Office 3,509,272

Patented Apr. 28, 1970

3,509,272

CIRCUIT ARRANGEMENTS FOR COLOUR TELEVISION CAMERAS

Ivanhoe John Penfound James, Ealing, London, England, Wieslaw Antoni Karwowski, Syracuse, N.Y., and David Ernest Kent, Iver, England, assignors to Electric & Musical Industries Limited, Hayes, England, a company of Great Britain Filed Jan. 30, 1967, Ser. No. 612,564

Claims priority, application Great Britain, Feb. 4, 1966, 4,909/66

Int. Cl. H04n 9/53

U.S. Cl. 178—5.4 5 Claims

ABSTRACT OF THE DISCLOSURE

An improved circuit arrangement for colour television cameras of the type which employ a separate luminance pick-up tube for generating signals related to the luminance Y of a picture is described. The circuit is provided with four input terminals for the receipt of $Y_W$, $R_N$, $G_N$ and $B_N$ signals respectively, the $R_N$, $G_N$ and $B_N$ colour signals being relatively narrow frequency band signals and the $Y_W$ signal being a relatively wide frequency band signal. The $R_N$, $G_N$ and $B_N$ signals are matrixed to form a relatively narrow frequency band luminance signal $Y_N$ which is similar to $Y_W$ over the frequency band spanned by the colour signals. Each of the signals $Y_W$, $R_N$, $G_N$, $B_N$ and $Y_N$ is gamma corrected and matrix circuits are provided for adding the difference between the gamma corrected wide and narrow frequency band luminance signals to each of the gamma corrected colour signals individually, thus providing three wide band output signals R′, G′and B′ where $$R'=R_N{}^{1/\gamma}+Y_W{}^{1/\gamma}-Y_N{}^{1/\gamma}$$
$$G'=G_N{}^{1/\gamma}=Y_W{}^{1/\gamma}-Y_N{}^{1/\gamma}$$

and $$B'=B_N{}^{1/\gamma}+Y_W{}^{1/\gamma}-Y_N{}^{1/\gamma}$$

These three wide band output signals can be fed directly to a standard colour waveform encoder.

This invention relates to improved circuit arrangements for colour television cameras and especially to such circuit arrangements as are required for processing the four signals obtained from separate luminance colour cameras to render them suitable for direct application to the three inputs of colour encoders and/or colour monitors.

It has been the practice in transmitters used for transmitting colour television according to the NTSC system to obtain signals R, B, and G corresponding to the three primary colours from three camera tubes and to derive therefrom by means of an encoder a luminance signal Y′ of the form $$0.30R^{1/\gamma}+0.59G^{1/\gamma}+0.11B^{1/\gamma}$$

and two colour difference signals of the form $$R^{1/\gamma}-Y'$$
$$G^{1/\gamma}-Y'$$

and these three signals represent the intelligence which is transmitted. Difficulties arise due to the inevitable inaccuracy of registration of the three camera tubes, and this causes detail information, representing horizontal and vertical resolution to be lost. It has been proposed to reduce these difficulties by using a separate luminance colour camera, for instance, a camera equipped with four camera tubes, three supplying the signals R, B and G respectively and the fourth supplying a luminance signal Y. However, the gamma corrected monochrome signal $Y^{1/\gamma}$ differs from the signal Y′ and if it is used in place thereof in an NTSC transmitter, whilst the luminance signal will be correct and will provide accurate reproduction in a monochrome receiver the colour difference signals will be different and when used in a colour receiver will provide inaccurate colour fidelity. Thus $Y^{1/\gamma}+(R^{1/\gamma}-Y')$ is not equal to $Y'+(R^{1/\gamma}-Y')$.

It is an object of the present invention to provide a circuit arrangement for use in a colour television system which when supplied with input signals derived from four camera tubes as described above produces three output signals which are modified signals relating to the red, green and blue components of the picture and which can be applied to an encoder to derive luminance and colour difference signals of an improved composition.

A further problem arises with such a four tube colour camera (or its two tube equivalent) in that there are four output signals, namely, Y, R, G and B, whereas the normal display colour monitor has three input terminals to which R, G and B signals have to be applied. Such a display monitor (or receiver) is required either for monitoring the camera signals before encoding into, for example, the NTSC or PAL system or for closed circuit colour television applications where no encoding is involved. Similar problems arise when the encoder is only provided with three input terminals designed to accept R, G and B signals.

A further object of this invention is therefore to provide a circuit arrangement, which when supplied with four input signals processes them to produce three output signals suitable for direct application to an RGB colour monitor or to an RGB encoder.

According to one aspect of the invention there is provided a circuit arrangement for a colour television camera comprising:

(a) A first input terminal for a relatively wide frequency band luminance signal, $Y_W$, from a luminance camera tube, relating to the luminance component of a picture, (b) Three other input terminals for relatively narrow frequency band colour signals, $R_N$, $G_N$ and $B_N$ respectively and relating to the red, green and blue components of the picture, (c) A first matrixing circuit having respective connections to each of said three other input terminals, an output terminal, and means for providing at said output terminal a relatively narrow band luminance signal, $Y_N$, of the form $Y_N=lR_N+mG_N+nR_N$ in which $l$, $m$ and $n$ are luminosity coefficients, (d) A first gamma correcting circuit connected to said first input terminal, second, third and fourth gamma correcting circuits respectively connected to said three other input terminals and a fifth gamma correcting circuit connected to the output terminal of said first matrixing circuit, said five gamma correcting circuits producing at their outputs the signals $Y_W{}^{1/\gamma}$, $R_N{}^{1/\gamma}$, $G_N{}^{1/\gamma}$, $B_N{}^{1/\gamma}$ and $Y_N{}^{1/\gamma}$ respectively, (e) Three further matrixing circuits, each having three input connections, one input connection of each of the said further matrixing circuits being connected to the output of said first gamma correcting circuit, another input connection of each of the said further matrixing circuits being connected to the output of the said first matrixing circuit and the remaining input connection on said three further matrixing circuits being connected to the outputs of said second, third and fourth gamma correcting circuits respectively, said matrixing circuits providing signals at the output terminals of the said three further matrixing circuits represented by $$R'=R_N{}^{1/\gamma}+Y_W{}^{1/\gamma}-Y_N{}^{1/\gamma}$$
$$G'+G_N{}^{1/\gamma}+Y_W{}^{1/\gamma}-Y_N{}^{1/\gamma}$$

and $$B'=B_N^{1/\gamma}+Y_W^{1/\gamma}-Y_N$$

respectively.

According to another aspect of the invention there is provided a circuit arrangement for a colour television camera comprising (a) A first input terminal for a luminance signal, $Y_W$, relating to the luminance component of a picture, (b) Three other input terminals for colour signals designated R, G and B respectively, (c) Gamma correcting means connected to said first input terminal for gamma correcting said $Y_W$ signal and thereby producing a relatively wide frequency band, gamma corrected luminance signal $Y_W^{1/\gamma}$, (d) Three circuits including gamma correcting means and respectively connected to said three other input terminals for providing three gamma corrected colour signals $R_N^{1/\gamma}$, $G_N^{1/\gamma}$ and $B_N^{1/\gamma}$, the suffix N denoting a bandwidth narrower than that denoted by the suffix W, (e) A further circuit having three input terminals respectively connected to said three other input terminals, an output terminal and means including gamma correcting means for providing at said output terminal a second gamma corrected luminance signal $Y_N^{1/\gamma}$, (f) Three further matrix circuits for deriving from the five gamma corrected signals $Y_W^{1/\gamma}$, $R_N^{1/\gamma}$, $G_N^{1/\gamma}$, $B_N^{1/\gamma}$ and $Y_N^{1/\lambda}$, three colour dependent wide band output signals R', G' and B' respectively where $$R'=R_N^{1/\gamma}+Y_W^{1/\gamma}-Y_N^{1/\gamma}$$
$$G'=G_N^{1/\gamma}+Y_W^{1/\gamma}$$

and $$B'=B_N^{1/\gamma}+Y_W^{1/\gamma}-Y_N^{1/\gamma}$$

In order that the present invention may be clearly understood and readily carried into effect it will now be described by way of example with reference to the single figure of the accompanying drawing which shows in block form a circuit arrangement according to the invention.

Referring to the figure and input terminal is indicated at 1 and three other input terminals at 2, 3 and 4 respectively. A luminance camera tube may be connected to terminal 1 as shown at 1*a* and camera tubes for red, green and blue components of the picture may be connected to terminals 2, 3 and 4 respectively as shown at 2*a*, 3*a* and 4*a*. It is assumed that the outputs from the camera tubes bear a linear relationship to the light intensities and the outputs will be designated as $Y_W$, $R_N$, $G_N$ and $B_N$. The first signal is of relatively wide frequency band and the other three signals are of a relatively narrow frequency band. The narrower frequency band of said other three signals can be a result of poorer definition optical systems for the relevant camera tubes or a result of utilising larger scanning beams in said camera tubes, or because said beams are defocused relatively. The four signals are applied to gamma correcting circuits 5, 6, 7 and 8 respectively and the outputs from said gamma correcting circuits are $Y_W^{1/\gamma}$, $R_N^{1/\gamma}$, $G_N^{1/\gamma}$ and $B_N^{1/\gamma}$ respectively.

The signals at the terminals 2, 3 and 4 are also applied to a matrix circuit 9 which combines the signals $R_N$, $G_N$ and $B_N$ to produce an output $$(0.30R_B+0.59G_N+0.11B_N)$$

which is designated as $Y_N$. Thus $Y_N$ is a relatively narrow frequency band signal similar to the signal $Y_W$ produced by the luminance camera tube 1*a*. The signal $Y_N$ is passed to gamma correcting circuit 10 which produces an output signal $Y_N^{1/\gamma}$ and thence to an inverting circuit 11, for example an inverting operational amplifier having approximately equal feedback and input impedances, which produces therefrom an output signal $-Y_N^{1/\gamma}$.

The signal $Y_W^{1/\gamma}$ from the gamma correcting circuit 5, the signal $1R_N^{1/\gamma}$ from the gamma circuit 6 and the signal $-Y_N^{1/\gamma}$ from the inverter circuit 11 are applied to the matrix circuit 12 which adds the three signals together to produce an output signal $Y_W^{1/\gamma}+R_N^{1/\gamma}-Y_N^{1/\gamma}$, that is of the form $R_N^{1/\gamma}+Y_H^{1/\gamma}$ where $Y_H^{1/\gamma}$ represents the difference between $Y_W^{1/\gamma}$ and $Y_N^{1/\gamma}$ which is a gamma corrected signal representing the high frequency components of a luminance signal. In a similar manner, as will be seen from the drawing, signals of the form $G_N^{1/\gamma}+Y_N^{1/\gamma}$ and $B_N^{1/\gamma}+Y_N^{1/\gamma}$ are obtained from matrix circuits 13 and 14. The three outputs from the matrix circuits 12, 13 and 14 are R', G', and B' respectively. The matrix circuits 9, 12, 13 and 14 may each comprise resistive summing networks as shown in FIGURE 8—8 of page 251 of the Second Edition of 'Electron Tube Circuits' by Samuel Seely, published by McGraw Hill Book Co. Inc. These signals R', G' and B' can be used to operate individual monitors for the three colours, and can also be used in place of the signals $R^{1/\gamma}$, $G^{1/\gamma}$ and $B^{1/\gamma}$ as described above to produce the modified luminance signal Y' and the colour difference signals corresponding to $R^{1/\gamma}-Y'$ and $G^{1/\gamma}-Y'$. Because of the modified form of the signals R', G' and B' the high frequency luminance information is carried entirely by the signal Y' and as this is transmitted by a NTSC transmitter with a relatively wide frequency band width none is lost in the transmission in the manner described above. Furthermore, since in the frequency band of the colour signals the luminance and colour difference signals are similar to those produced by a three-tube camera, the colour fidelity remains correct.

The invention is not limited in application to the NTSC system of colour television but is applicable, for example to the PAL and SECAM systems.

What we claim is:

1. A circuit arrangement for a colour television camera comprising (a) a first input terminal for a relatively wide frequency band luminance signal, $Y_W$, from a luminance camera tube, relating to the luminance component of a picture, (b) three other input terminals for relatively narrow frequency band colour signals, $R_N$, $G_N$ and $B_N$ respectively and relating to the red, green and blue components of the picture, (c) a first matrixing circuit having respective connections to each of said three other input terminals, an output terminal, and means for providing at said output terminal a relatively narrow band luminance signal, $Y_N$, of the form $Y_N=lR_N+mG_N+nB_N$, in which *l*, *m* and *n* are luminosity coefficients, (d) a first gamma correcting circuit connected to said first input terminal, second, third and fourth gamma correcting circuits respectively connected to said three other input terminals and a fifth gamma correcting circuit connected to the output terminal of said first matrixing circuit, said five gamma correcting circuits producing at their outputs the signals, $Y_N^{1/\gamma}$, $R_N^{1/\gamma}$, $G_N^{1/\gamma}$, $B_N^{1/\gamma}$ and $Y_N^{1/\gamma}$ respectively, (e) three further matrixing circuits, each having three input connections, one input connection of each of the said further matrixing circuits being connected to the output of said first gamma correcting circuit, another input connection of each of the said further matrixing circuits being connected to the output of the said first matrixing circuit and the remaining input connection on said three further matrixing circuits being connected to the outputs of said second, third and fourth gamma correcting circuits respectively, said matrixing circuits providing signals at the output terminals of the said three further matrixing circuits represented by $$R'=R_N^{1/\gamma}+Y_W^{1/\gamma}-Y_N^{1/\gamma}$$
$$G'=G_N^{1/\gamma}+Y_W^{1/\gamma}-Y_N^{1/\gamma}$$

and $$B'=B_N^{1/\gamma}+Y_W^{1/\gamma}-Y_N^{1/\gamma}$$

respectively.

2. A circuit arrangement for a colour television camera comprising (a) a first input terminal for a luminance signal, $Y_W$, relating to the luminance component of a picture, (b) three other input terminals for signals designated R, G and B respectively, (c) gamma correcting means connected to said first input terminal for gamma correcting said $Y_W$ signal and thereby producing a relatively wide frequency band, gamma corrected luminance signal $Y_W^{1/\gamma}$, (d) three circuits including gamma correcting means and respectively connected to said three other input terminals for providing three gamma corrected colour signals $R_N^{1/\gamma}$, $G_N^{1/\gamma}$ and $B_N^{1/\gamma}$, the suffix N denoting a bandwidth narrower than that denoted by the suffix W, (e) a further circuit having three input terminals respectively connected to said three other input terminals, an output terminal and means including gamma correcting means for providing at said output terminal a second gamma corrected luminance signal $Y_N^{1/\gamma}$, (f) three further matrix circuits for deriving from the five gamma corrected signals $Y_W^{1/\gamma}$, $R_N^{1/\gamma}$, $G_N^{1/\gamma}$, $B_N^{1/\gamma}$ and $Y_N^{1/\gamma}$ three colour dependent wide frequency band output signals R′, G′ and B′ respectively where $$R'=R_N^{1/\gamma}+Y_W^{1/\gamma}-Y_N^{1/\gamma}$$
$$G'=G_N^{1/\gamma}+Y_W^{1/\gamma}-Y_N^{1/\gamma}$$

and $$B'=B_N^{1/\gamma}+Y_W^{1/\gamma}-Y_N^{1/\gamma}$$

3. A system including a circuit arrangement according to claim 1 in which (a) a luminance camera tube is connected to the first input terminal and generates signals relating to the luminance of a picture (b) three camera tubes are connected respectively to said three other input terminals and generate signals respectively representing the red, green and blue components of said picture.

4. A system according to claim 3 in which said three camera tubes provide signals of relatively narrow frequency band width and said luminance camera tube provides signals of a relatively wide frequency bandwidth.

5. A system according to claim 4 in which each of said three camera tubes is provided with an optical system of sufficiently low definition to produce signals $R_N$, $G_N$ and $B_N$ of relatively low frequency bandwidth.

References Cited

UNITED STATES PATENTS 3,196,205 7/1965 Bedford ............ 178—5.4
3,272,916 9/1966 James et al.
3,288,921 11/1966 James et al.

ROBERT L. GRIFFIN, Primary Examiner

A. H. EDDLEMAN, Assistant Examiner